United States Patent [19]

Latsch et al.

[11] 4,178,891

[45] Dec. 18, 1979

[54] METHOD AND APPARATUS FOR CONTROLLING THE OPERATION OF AN INTERNAL COMBUSTION ENGINE

[75] Inventors: Reinhard Latsch, Vaihingenn; Valerio Bianchi, Hochdorf, both of Fed. Rep. of Germany; Reiner Burkel, Le Chesney, France

[73] Assignee: Robert Bosch GmbH, Stuttgart, Fed. Rep. of Germany

[21] Appl. No.: 665,797

[22] Filed: Mar. 11, 1976

Related U.S. Application Data

[63] Continuation-in-part of Ser. No. 564,073, May 27, 1975, abandoned.

[30] Foreign Application Priority Data

Mar. 11, 1975 [DE] Fed. Rep. of Germany ....... 2510526

[51] Int. Cl.² .............................................. F02P 5/04
[52] U.S. Cl. .............................. 123/117 R; 123/117 D
[58] Field of Search ..................... 123/117 R, 32 EA; 73/70.1, 517 A, 35

[56] References Cited

U.S. PATENT DOCUMENTS

| | | | |
|---|---|---|---|
| 2,655,036 | 10/1953 | Chapman | 73/517 A |
| 3,142,967 | 8/1964 | Schweitzer | 123/117 R |
| 3,596,643 | 8/1971 | Schweitzer | 123/117 R |
| 3,789,816 | 2/1974 | Taplin et al. | 123/32 CA |
| 3,872,846 | 3/1975 | Taplin et al. | 123/32 EA |
| 3,977,373 | 8/1976 | Sand | 123/117 R |

*Primary Examiner*—Ronald B. Cox
*Attorney, Agent, or Firm*—Edwin E. Greigg

[57] ABSTRACT

A method for controlling the operation of an internal combustion engine based on dynamic engine stability (roughness) compares actual running data with an rpm-dependent but smooth reference signal to obtain a measure of the torque fluctuations of the engine. This measure is fed to a final control element which adjusts the ignition timing angle of the engine alone or in addition to the adjustment of other engine parameters, such as the fuel-air ratio and/or the exhaust gas recycle rate.

3 Claims, 2 Drawing Figures

METHOD AND APPARATUS FOR CONTROLLING THE OPERATION OF AN INTERNAL COMBUSTION ENGINE

This application is a continuation-in-part of application Ser. No. 564,073 filed 5/27/75 and now abandoned.

BACKGROUND OF THE INVENTION

The invention relates to a method and an apparatus for controlling the operation of an internal combustion engine in a predetermined domain. The method and apparatus relate to changes in the fuel-air ratio provided to the engine or the amount of recycled exhaust gas in dependence on the dispersion of the cyclic variations of the mean combustion chamber pressure during intervals which are synchronous with the engine r.p.m. (dynamic stability control). A method and apparatus of this type was described in allowed parent patent application Ser. No. 564,073, now abandonded to which the present application is a continuation-in-part. The method and apparatus of the parent application Ser. No. 564,073 relates to controlling the operational behavior in a predetermined domain near the lean running limit of the engine.

Due to the increasingly rigorous regulations concerning exhaust gas composition and in view of the general fuel shortage, there is the need for methods and means for operating internal combustion engines in a domain wherein the toxic components of the exhaust gas can be reduced to a minimum and/or in which a minimum amount of fuel is used. When an engine is operated near the so-called lean running limit, a relatively innocuous exhaust gas and low fuel consumption may be expected, but the determination of the desired lean running limit is difficult. The sharply fluctuating pressures in the various cylinders of the engine during such operation provide some information regarding the engine operation but in practically useable cases, this pressure can be determined only with difficulty. For this reason, the parent application Ser. No. 564,073 proposes to measure the fluctuation of the mean combustion chamber pressure indirectly by measuring changes in the crankshaft speed or acceleration due to fluctuations in torque and to make this measurement, for example, by measuring the period of rotation between two predetermined angular positions of the crankshaft. The fluctuations of the angular velocity of the crankshaft may be measured by a suitable circuit described in the parent application and may be compared with a set-point value which is itself changeable, depending on r.p.m. and, for example, induction tube pressure, and which relates to a just permissible engine instability in any particular operational domain. A comparison of the actual and set-point values generates an output signal which is preferably fed to an integrating final control element whose output signal may be used to regulate the fuel-air ratio provided to the engine or else to regulate the quantity of recycled exhaust gas.

Yet another engine variable which must be adapted and changed according to the prevailing engine operating conditions is the ignition angle $\alpha$. It is known to change the ignition angle of an internal combustion engine based on the changes in vacuum in the induction tube, thereby achieving a desired spark advance. It is also known to change the ignition angle in dependence on the r.p.m. by means of centrifugal governors.

Yet another method for adjusting the ignition timing of the engine is made known by the German Auslegeschrift No. 1,125,230 which describes how one may use another engine variable than the ignition timing, for example, the fuel-air ratio, the degree of compression, or the like, to undergo continuous oscillating changes at a rate which is relatively slow compared with the engine r.p.m. and to use the resultant positive and negative r.p.m. changes of the crankshaft for adjusting the center of oscillations of the controlled engine variable.

OBJECT AND SUMMARY OF THE INVENTION

It is a principal object of the invention to provide a method and an apparatus for controlling an internal combustion engine by adjusting the ignition angle of the engine in such a manner as to permit flawless adaptation of the ignition angle to different operational conditions of the engine.

This principal object of the invention is achieved by improving the method described in the parent application Ser. No. 564,073 and by providing that the ignition angle is also changed, in addition to changing the fuel-air mixture and/or the recycled exhaust gas in addition to the other changed variables, or, if these other variables are held constant, the ignition angle is the only variable which is adjusted. Thus, the invention provides that, when the value of $\lambda$ in the domain $\lambda = 1$ is fixed, and the exhaust gas recycle rate AR is also fixed for fixed values of $\lambda$, then the ignition angle $\alpha$ is controlled based on the signal related to the dynamic instability of the engine as disclosed in the parent application. During such control, the air number $\lambda$ may:

1. Be controlled as usual or;
2. Be held constant at $\lambda = 1$ in a control loop, in particular by means of an exhaust gas sensor, especially an oxygen sensor; or, finally,
3. The air number may be used to define an extreme value control, for example, the air number $\lambda$ may be adjusted for maximum engine torque.

This adjustment can be obtained by a very rapid and r.p.m.-synchronous variation of the air number $\lambda$ about a predetermined center of oscillation.

The apparatus of the parent application generates a signal which is a function of the dynamic instability of the engine for engaging an engine variable so as to control the dynamic instability to either a maximum value, or at least such a value that is defined by a setpoint. In other words, a normally r.p.m.-dependent set-point defines a just permissible dynamic instability in any particular operational domain and, in the case dealt with by the present invention, the ignition angle of the engine would be so changed that the desired value of the dynamic engine instability, i.e., the value of the setpoint, is, in fact, obtained.

The ignition angle of the engine may actually be altered by means of a servo motor which receives the control signal which, in this case, need not be integrated. The servo motor may be so associated with the distributor of the engine that a mechanical adjustment of the ignition angle takes place in a region from 0° to 50° or 60° earlier than the top dead center of the pistons of the engine. However, the instability signal generated by the apparatus of the parent application may also be used to engage electronic ignition systems and to adjust the ignition angle in electronic manner.

In principle, the present invention is capable of improving any system which generates a signal proportional to engine instability and which uses that signal to engage an engine variable in the sense of adjusting the engine instability or roughness to a predetermined value, for example as proposed in patent application Ser. No. 597,404, filed on June 18, 1975 based on the German priority No. P 24 34 743.1.

The invention will be better understood as well as further objects and advantages thereof become more apparent from the following detailed description of an exemplary embodiment taken in conjunction with the drawing.

DESCRIPTION OF THE PREFERRED EMBODIMENT

Figure 1:
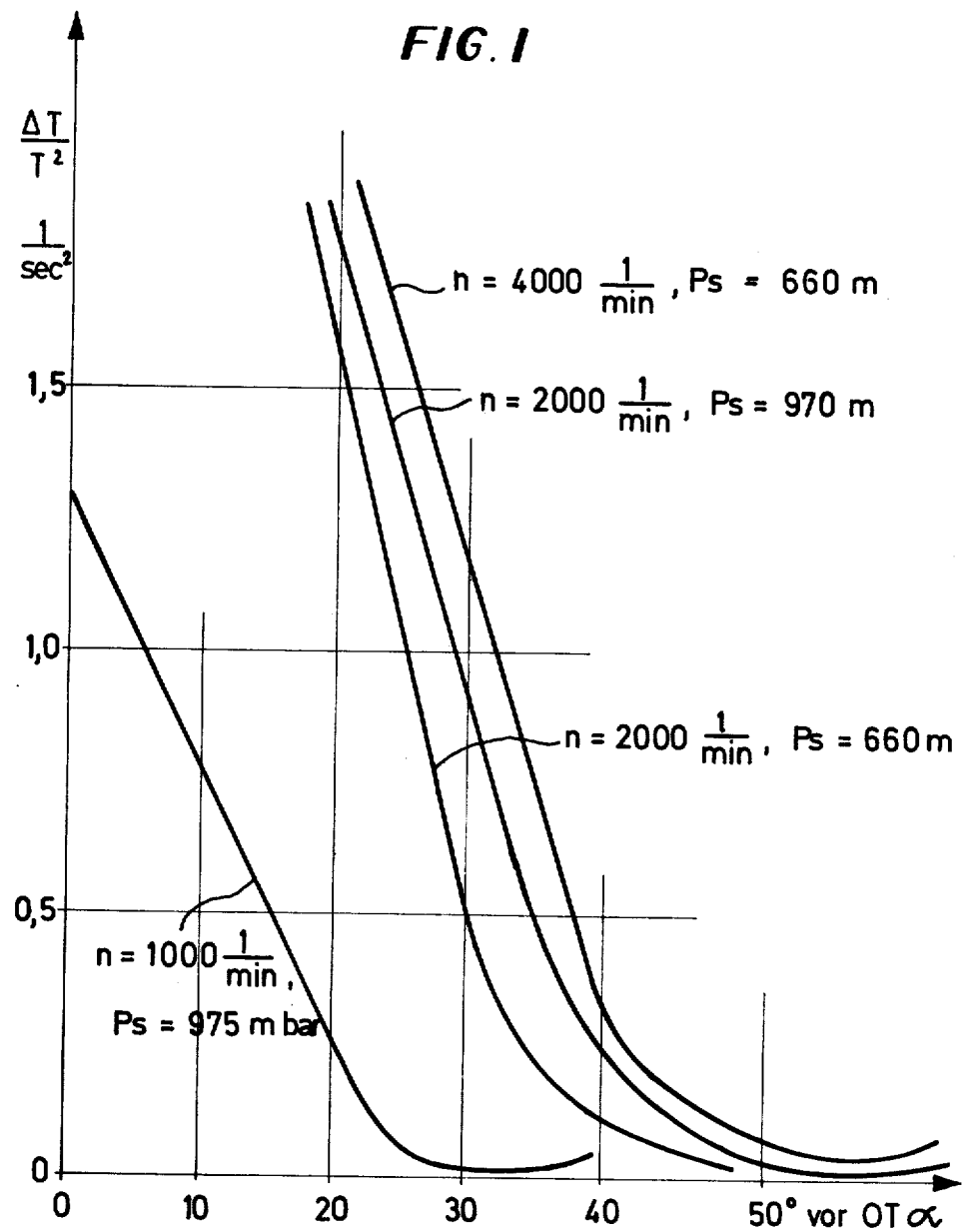
FIG. 1 is a diagram showing plots of the dynamic engine instability expressed as the r.p.m. change per revolution ($\Delta T/T^2$) as a function of the ignition angle $\alpha$ for various pressures and r.p.ms.

Turning now to FIG. 1, it will be noted that T is the period of a single crankshaft revolution and $\Delta T$ is the dispersion in the value of T in sequential revolutions. It may be seen from the figure that the r.p.m. change per revolution, as a measure of the dynamic instability of the engine, increases with decreasing spark advance angle. At relatively large ignition angles, there is found a minimum value of the dynamic instability (optimum engine smoothness). It should be noted that it is not necessarily desirable to regulate the engine to operate at this minimum point of roughness, because other reasons may dictate using a different set-point value.

Figure 2:
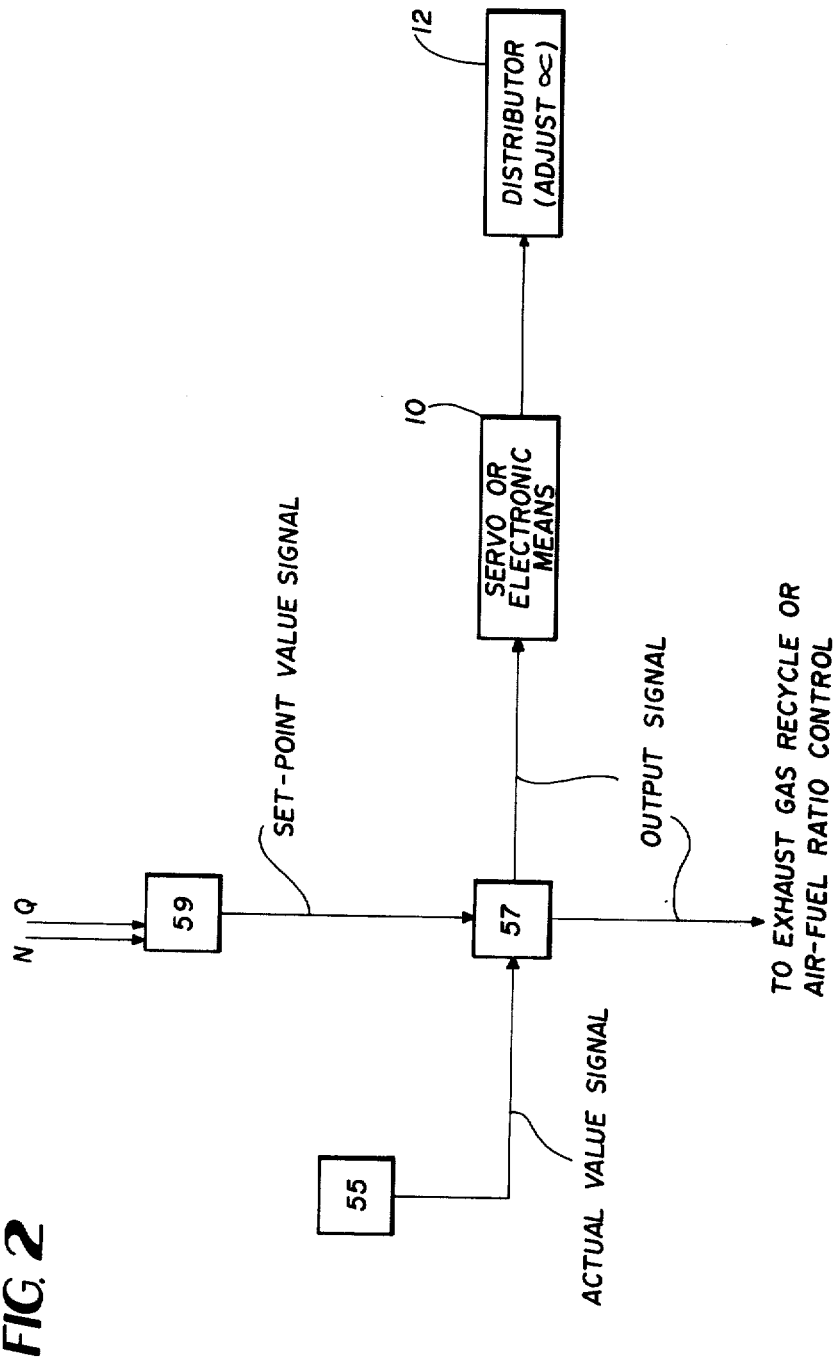
FIG. 2 is a bolck diagram of the apparatus for effecting ignition angle adjustment.

A change of the ignition angle in the direction of retardation makes possible a reduction in the emission of the toxic components HC and $NO_x$. For this reason, the invention is particularly suitable for achieving low values of HC and $NO_x$ emissions because it permits achieving late ignition while maintaining satisfactory engine smoothness. The mechanical stability or smoothness which is measured by the smoothness signal generated in the apparatus of the parent application is a measure of the thermal processes and reactions in the combustion chamber. For example, in FIG. 2 there is illustrated, in block diagram form, the arithmetic circuit 55, the comparator 57 and the function generator 59 of the apparatus allowed in the above-noted parent application. The circuit 55 generates an actual value signal of the controlled variable, the function generator 59 generates a set-point value signal, and the comparator 57 compares the two signals and generates an output signal which is applied to control the recycled exhaust gas or the air-fuel ratio, in accordance with the invention disclosed in the parent application. In addition, the output signal from the comparator 57 can be applied to a servo or electronic means 10 which adjusts the ignition angle by an adjustment in the distributor 12, all in accordance with the present invention.

The invention permits an adaptation of the ignition angle to different thermal conditions of the engine and to different fuels provided to the engine, and to other engine conditions.

What is claimed is:

1. A method for controlling the operation of an internal combustion engine, comprising the steps of:
    (A) determining a measurement-time interval, the duration of which corresponds to an angular region of the crankshaft rotation related to at least one stroke of a piston of the engine;
    (B) generating a measurement value from an engine operating parameter during the measurement-time interval, said generated measurement value varying during the measurement-time interval as a measure of the fluctuations of the angular speed of the crankshaft over said angular region, and corresponding to the average combustion chamber pressure;
    (C) integrating the measurement value generated;
    (D) comparing an integrated measurement value generated during a subsequent measurement-time interval and generating a differential value as an actual value of the combustion chamber's average pressure;
    (E) generating a nominal value of the combustion chamber average pressure; and
    (F) adjusting the ignition timing angle of the engine in accordance with the difference between the nominal and actual values.

2. A method for controlling the operation of an internal combustion engine, comprising the steps of:
    (A) determining a measurement-time interval, the duration of which corresponds to an angular region of the crankshaft rotation related to at least one stroke of a piston of the engine;
    (B) generating a measurement value from an engine operating parameter during the measurement-time interval, said generated measurement value varying during the measurement-time interval as a measure of the fluctuations in the time taken by the crankshaft to rotate through said angular region and corresponding to the average combustion chamber pressure;
    (C) integrating the measurement value generated;
    (D) comparing an integrated measurement value generated during a subsequent measurement-time interval and generating a differential value as an actual value of the combustion chamber's average pressure;
    (E) generating a nominal value of the combustion chamber average pressure; and
    (F) adjusting the ignition timing angle of the engine in accordance with the difference between the nominal and actual values.

3. An apparatus for controlling the operation of an internal combustion engine, which includes a crankshaft and distributor means, comprising:
    (A) sensor means associated with the crankshaft, for sensing crankshaft rotation during a predetermined measurement-time interval and forming an electrical signal related to the crankshaft rotation, said measurement-time interval corresponding to an angular region of the crankshaft rotation related to at least one stroke of a piston of the engine;
    (B) actual value signal generator means including integration means, connected to said sensor means, for integrating sequential ones of the electrical signals generated by the sensor means generating during the predetermined measurement-time interval an electrical actual value signal related to the speed of rotation of the crankshaft, which signal is representative of the fluctuation in the average combustion chamber pressure in two sequential time intervals;

(C) nominal value signal generator means, for generating an electrical nominal value signal from engine parameters;
(D) comparator means, for electrically comparing said actual value signal with said nominal value signal and for forming an electrical output signal; and
(E) servo means, connected to the output of said comparator means and to said distributor means, for adjusting the ignition timing angle of the internal combustion engine in response to the electrical output signal.

* * * * *